No. 761,022. PATENTED MAY 24, 1904.
P. H. WALSH.
MEASURING INSTRUMENT.
APPLICATION FILED MAY 27, 1903.
NO MODEL. 4 SHEETS—SHEET 1.
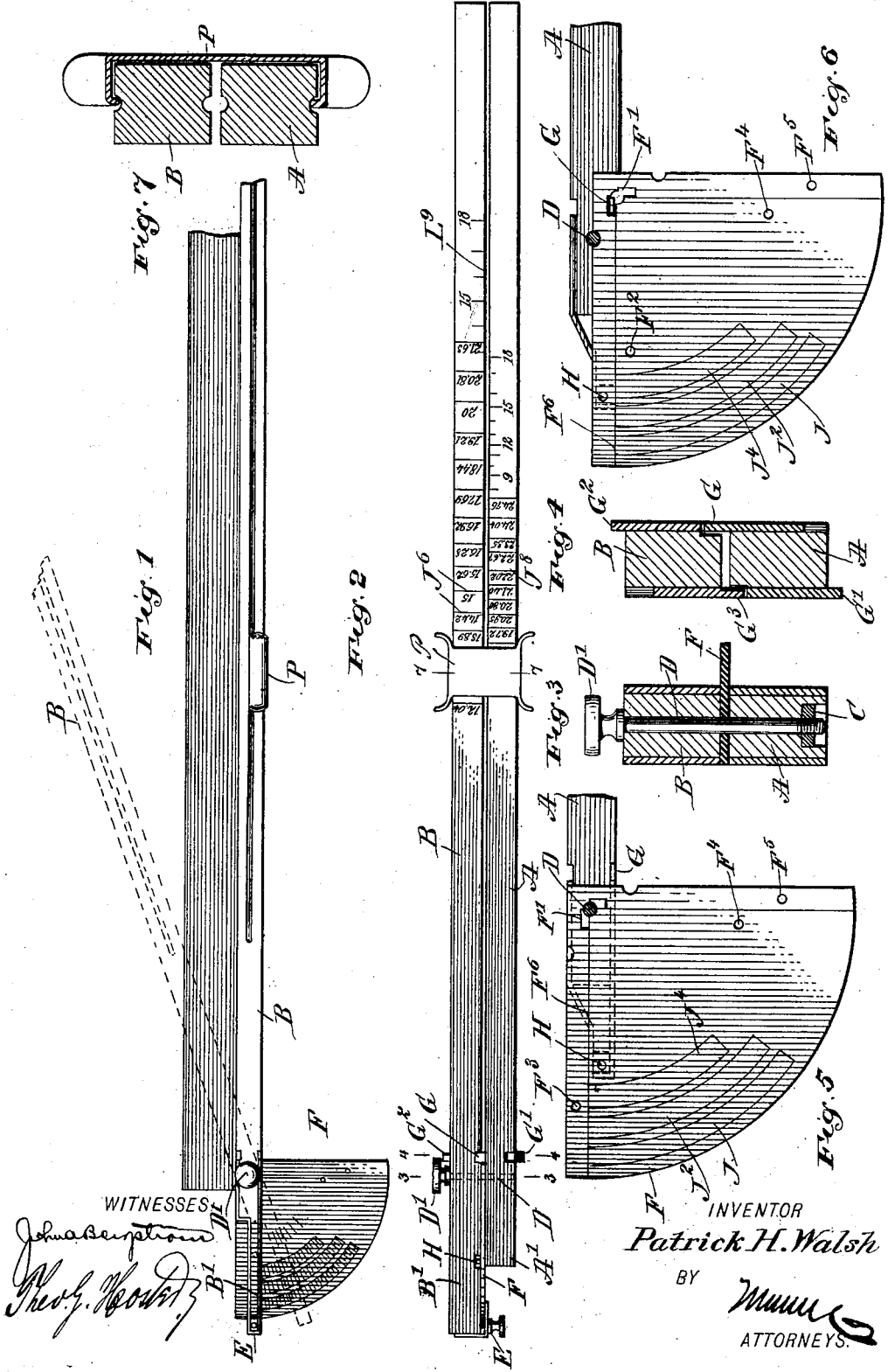
INVENTOR
Patrick H. Walsh

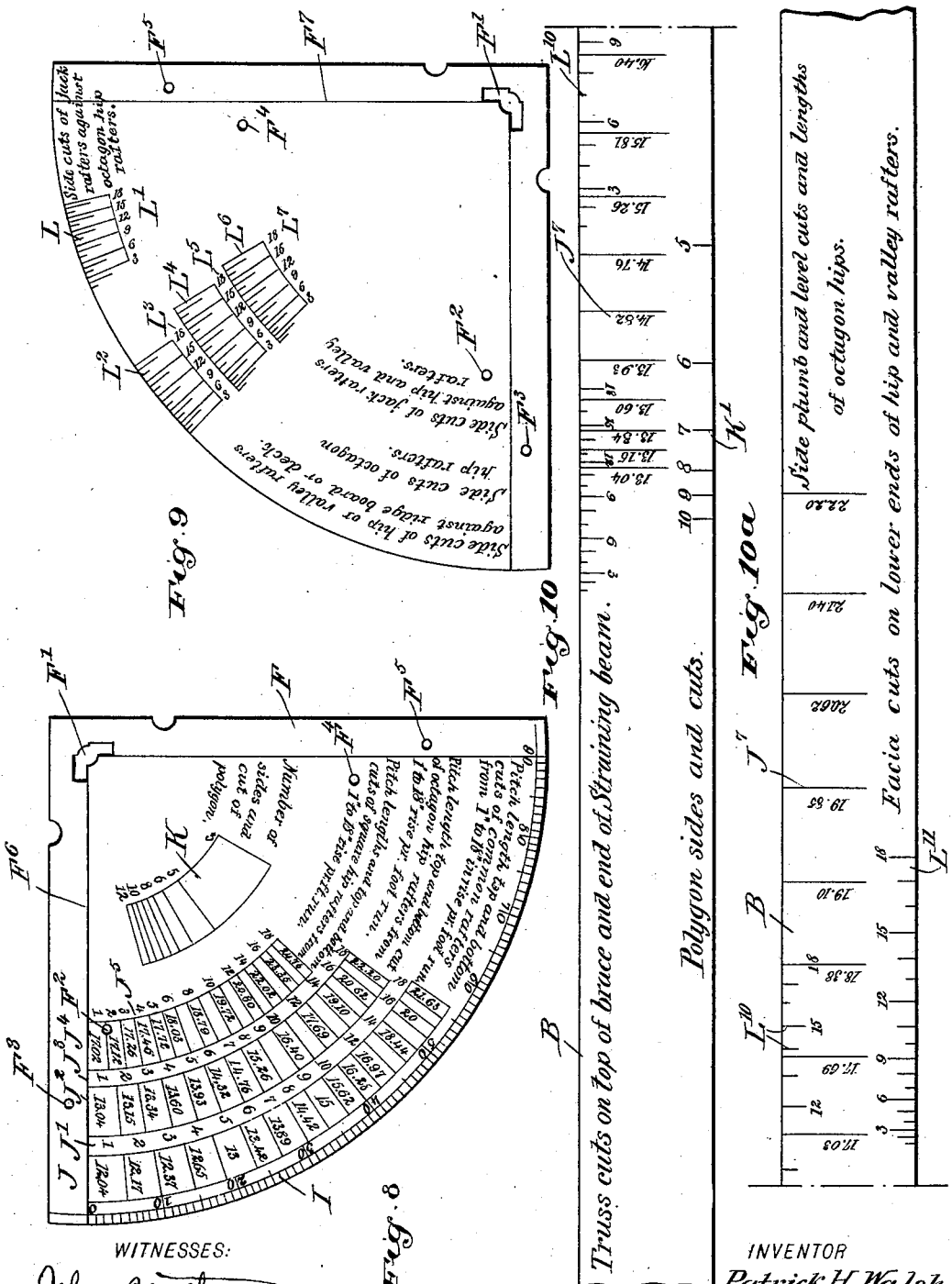

No. 761,022. PATENTED MAY 24, 1904.
P. H. WALSH.
MEASURING INSTRUMENT.
APPLICATION FILED MAY 27, 1903.

NO MODEL. 4 SHEETS—SHEET 3.

WITNESSES:

INVENTOR
Patrick H. Walsh
BY
ATTORNEYS.

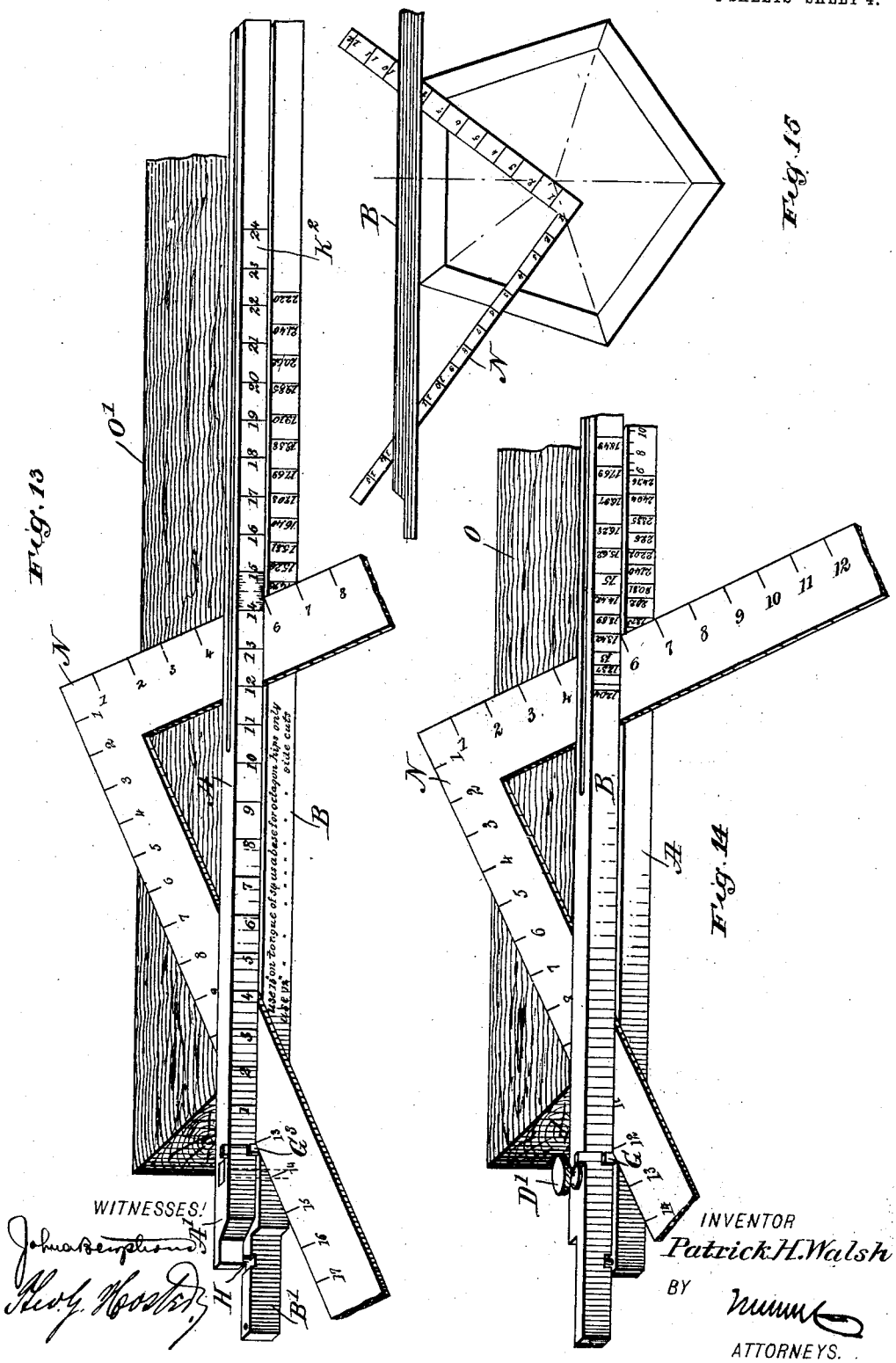

No. 761,022.

Patented May 24, 1904.

UNITED STATES PATENT OFFICE.

PATRICK HENRY WALSH, OF BAYONNE, NEW JERSEY, ASSIGNOR OF ONE-HALF TO PATRICK J. SLOAN, OF BAYONNE, NEW JERSEY.

MEASURING INSTRUMENT.

SPECIFICATION forming part of Letters Patent No. 761,022, dated May 24, 1904.

Application filed May 27, 1903. Serial No. 158,942. (No model.)

*To all whom it may concern:*

Be it known that I, PATRICK HENRY WALSH, a citizen of the United States, and a resident of Bayonne, in the county of Hudson and State of New Jersey, have invented a new and Improved Measuring Instrument, of which the following is a full, clear, and exact description.

The invention relates to instruments such as are used by carpenters and other mechanics in the framing of buildings and the like; and the object of the invention is to provide a new and improved measuring instrument arranged to permit the mechanic to readily obtain the lengths and cuts of rafters of all kinds, the joints and sides of polygonal figures, miter cuts, &c., in a very simple and easy manner without requiring further calculations or measurements.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a plan view of the improvement. Fig. 2 is a side elevation of the same. Fig. 3 is an enlarged cross-section of the same on the line 3 3 of Fig. 2. Fig. 4 is a similar view of the same on the line 4 4 of Fig. 2. Fig. 5 is an enlarged plan view of the scale-plate in position on the lower arm, the upper arm being removed and the pivot shown in section. Fig. 6 is a similar view of the same, showing the scale-plate in a different position on the arm. Fig. 7 is an enlarged cross-section of the arms and the clamp for holding the same locked together, the section being on the line 7 7 of Fig. 2. Fig. 8 is an enlarged face view of the scale-plate. Fig. 9 is a face view of the reverse side of the scale-plate. Figs. 10 and 10$^a$ are enlarged side elevations of one side of the upper arm, showing the scales thereon. Figs. 11 and 11$^a$ are similar views of the other side of the upper arm. Figs. 12 and 12$^a$ are face views of one side of the other or lower arm, showing the scales thereon. Fig. 13 is a perspective view of the improvement as applied in connection with an ordinary carpenter's square for obtaining the length and both cuts of octagon rafters when the pitch is given. Fig. 14 is a like view of the same arranged in connection with a carpenter's square for obtaining the length and both cuts of ordinary rafters, the pitch being given; and Fig. 15 is a face view of the improvement arranged with a carpenter's square to obtain the bevels for the joints of polygonal figures.

The improved measuring instrument has two arms A and B, placed one on top of the other, as plainly illustrated in the drawings, and in the lower arm A is held a nut C, (see Fig. 3,) in which screws the lower or threaded end of a pivot D, extending through a bearing in the upper arm B, so as to allow the arms to swing one on the other. The upper end of the pivot D is provided with a head D' for screwing the pivot D downward in the nut C to clamp the arms A and B on each other to hold the same in any desired position they may be swung into by the user of the instrument.

The arms A and B are provided with extensions A' and B', of which the free end of the extension B' carries a suitable clamping device E, engaging a scale-plate F, removably held on the lower arm A between the top thereof and the bottom of the upper arm B, as plainly indicated in the drawings, the said extension B' indicating on graduations or scales on the faces of the said scale-plate F, as hereinafter more fully described. The scale-plate F is preferably in the form of a sector, having at its apex an angular opening F'', through the apex of which extends the pivot D and the side arms of which are adapted to be engaged by a lug G, Fig. 5, held on the front face of the lower arm A and projecting somewhat beyond the top thereof, as will be readily understood by reference to Fig. 2.

On the scale-plate F are formed apertures $F^2$ $F^3$ and $F^4$ $F^5$, adapted to engage a pin H, held on the top of the extension A', so as to allow of holding the scale-plate F in different positions on the top of the lower arm A, as will be readily understood by reference to Figs. 5 and 6—that is, when the plate F is in the position shown in Fig. 5 then the pivot D extends through the apex of the opening F' and the pin H engages the opening F². Now when it is desired to change the position of the scale-plate F to that shown in Fig. 6 then the pivot D is removed and the plate is lifted out of engagement with the pin H and is then shifted to engage one side of the opening F' with the stud G and to engage the aperture F³ with the pin H. When it is desired to reverse the scale-plate F— that is, to bring its under side to the top thereof—then use is made of the apertures F⁴ F⁵ to engage the pin H as described relative to the apertures F² and F³; but the opening F' is then engaged either by the pivot D or by the stud G to bring the scale-plate into the same relative positions shown in Figs. 5 and 6, only with the bottom side of the plate on the top. When the scale-plate F is in the position shown in Fig. 5, then a radial zero-line F⁶ on one face of the plate F coincides with the longitudinal middle line or center of the arm A, and when the scale-plate F is in the position shown in Fig. 6 then the radial zero-line coincides with the front face of the arm A, it being understood that the center of the said radial zero-line is at the axis of the pivot D. A similar zero-line F⁷ is on the other face of the scale-plate F for indicating the positions of the plate relative to the arm A the same as above described.

The upper face of the scale-plate F (see Fig. 8) is provided with a peripheral angle-scale I, and adjacent to this angle-scale is a scale J, indicating the pitch, length, and top and bottom cuts of common rafters from one inch to eighteen inches in rise per foot run, as indicated by a corresponding scale J', adjacent to the scale J. Next to this scale J' is arranged a scale J², indicating the pitch, length, and top and bottom cuts of octagon hip-rafters from one inch to eighteen inches rise per foot run, the latter being indicated on a scale J³, and next to this latter scale is arranged a scale J⁴, indicating the pitch, lengths, and top and bottom cuts of square hip-rafters from one inch to eighteen inches rise per foot run, the latter being indicated by a scale J⁵. A scale K is also arranged on the face of the scale-plate F to indicate the number of sides of a polygon. Now in order to set the instrument to any one of the scales it is only necessary to swing the upper arm B on the pivot D for the extension B' to indicate on the corresponding scale to enable the operator to obtain the desired information and to ascertain the desired bevels by the arms A and B.

The under side of the scale-plate F is provided with a graduation L, indicating side cuts of jack-rafters against octagon hip-rafters, the run being given by a scale L'. On the under side of the scale-plate is further arranged a scale L², indicating side cuts of hip or valley rafters against ridge or deck, the run being indicated by a scale L³, and next to this scale L³ is arranged a scale L⁴ for indicating side cuts of octagon hip-rafters, the run being indicated by a scale L⁵, and next to this scale is arranged a scale L⁶ for indicating side cuts of jack-rafters against hip and valley rafters, the run being marked on a scale L⁷.

It is understood that the scales on the reverse side of the scale-plate F are brought into use when the plate is reversed, as previously described, so that the extension B' can indicate on the scales L, L', L², L³, L⁴, L⁵, L⁶, and L⁷.

The arms A and B may be used for obtaining the same or similar results without the use of the scale-plate F, and for this purpose the front and rear sides of the arms are provided with scales, as plainly indicated in Figs. 2, 10, 10ᵃ, 11, 11ᵃ, 12, and 12ᵃ, corresponding to the scales previously mentioned. Thus the scale J⁶ on the arm B (see Figs. 11 and 11ᵃ) corresponds with the scale J. The scale J⁷, Figs. 10 and 10ᵃ, is the same as the scale J², and the scale J⁸ corresponds to the scale J⁴. (See Fig. 12.) The scale L⁸, Fig. 11, is the same as the scale L. The scale L⁹ corresponds to the scale L². The scale L¹⁰ corresponds to the scale L⁴, and the scale L¹¹ to the scale L⁶. The scale K', Fig. 10, corresponds with the polygonal side and cut scale K. On the rear face of the lower member A is a scale K², (see Fig. 13,) which indicates a linear graduation in inches, divided at the top and bottom into twelve and sixteen parts. The zero-points of the graduations on the arms are indicated by the studs G and G' on the lower arm and by studs G² G³ on the upper arm B. (See Figs. 1, 2, 4, 13, and 14.)

In order to render the scales serviceable, an ordinary carpenter's square N is employed in connection with the arms A and B—that is, one leg of the square is abutted either against the pin G (see Fig. 14) or against the pin G³, as shown in Fig. 13, for the square to swing on as a center between the arms A and B. As shown in Fig. 14, one leg of the carpenter's square N abuts at the twelve-inch mark on the stud G for common rafters, and the square is now swung between the arms A and B with the stud G as the fulcrum until the other leg of the carpenter's square indicates the rise—say six inches—on the graduation of the arm B to indicate the length—say thirteen and forty-two one-hundredths inches— of the rafter, and by placing the arms against a beam O the carpenter's square indicates the corresponding bevel at which the beam has to be cut. Now for using the device on octagon rafters it is necessary to apply one leg of the carpenter's square N on the stud G³ at the thirteen-inch mark, as plainly indicated in Fig. 13, and then the carpenter's square is shifted between the arms across the beam O' until the given rise—say six inches—indicates on the corresponding graduation of the arm A to enable the operator to read off the length of the rafter—say fourteen and three-eighths inches. In a like manner the square N is adjusted on the arm B, as indicated in Fig. 15, along the corresponding graduation to enable the user to obtain the joints and the lengths of the sides of polygons.

The instrument may readily be used for other purposes besides the ones indicated, and it will prove valuable in stair-building and the like to enable the user to obtain desired angles and cuts.

The arms A and B can be temporarily fastened together by a U-shaped slide P, having projections engaging longitudinal grooves in the top and bottom of the arms A and B.

Having thus described my invention, I claim as new and desire to secure by Letters Patent—

1. A measuring instrument, comprising two arms pivoted together a short distance from their ends, and a reversible scale-plate removably held on the projecting end of one of the arms and provided with scales, for the other projecting end of the other arm to indicate on, as set forth.

2. A measuring instrument, comprising two arms pivoted together a short distance from their ends, and a reversible scale-plate removably and adjustably held on the projecting end of one of the arms and provided with scales, for the projection of the other arm to indicate on, a number of the scales being on one face of the plate and the remainder on the other face of the plate, as set forth.

3. A measuring instrument, comprising a lower arm, an upper arm, a pivot held on one arm and on which the other is mounted to swing, the said arms having extensions beyond the pivot, the extensions being of unequal length, and a reversible scale-plate, removably and adjustably held on the extension of the shorter arm and on which indicates the extension of the longer arm, as set forth.

4. A measuring instrument comprising a lower arm, an upper arm, a pivot held on one arm and on which the other is mounted to swing, the said arms having extensions beyond the pivot, the extension of the upper arm being longer than the extensions of the lower arm, and a scale-plate, removably held on the extension of the lower arm and on which indicates the extension of the upper arm, the said scale-plate having an angular opening at the apex for engagement by the said pivot or a stud on the lower arm, as set forth.

5. A measuring instrument, comprising a lower arm, an upper arm, a pivot on one arm and on which the other arm is mounted to swing, the said arms having extensions beyond the pivot, a stud on one of the arms, and a scale-plate having an angular opening at its apex for engagement with either the pivot or stud, as and for the purpose set forth.

6. A measuring instrument comprising a lower arm, an upper arm, a pivot held on one arm and on which the other is mounted to swing, the said arms having extensions beyond the pivot, a scale-plate, removably held on the extension of the lower arm and on which indicates the extension of the upper arm, the said scale-plate having a plurality of apertures and an angular opening at the apex for engagement by the said pivot or a stud on the lower arm, and a retaining-pin on the extension of the lower arm, adapted to engage any one of the apertures in the said scale-plate, as set forth.

7. A measuring instrument comprising a lower arm, an upper arm, a pivot held on one arm and on which the other is mounted to swing, the said arms having extensions beyond the pivot, the extension of the upper arm being longer than the extension of the lower arm, a scale-plate, removably held on the extension of the lower arm and on which indicates the extension of the upper arm, and a clamping device on the outer end of the upper-arm extension, engaging the said scale-plate, as set forth.

8. A measuring instrument, comprising a lower arm, an upper arm, a pivot on one arm and on which the other arm is mounted to swing, the arms having extensions of unequal length, a stud on one arm, a scale-plate having an angular opening for engagement with either the pivot or stud, and a clamping device on the outer end of the longer extension for engaging the scale-plate, as set forth.

In testimony whereof I have signed my name to this specification in the presence of two subscribing witnesses.

PATRICK HENRY WALSH.

Witnesses:
PATRICK J. SLOAN,
JAMES J. BOYLAN.